Aug. 17, 1965  W. F. DU BOIS  3,201,072
MOTOR-VEHICLE RECEPTACLE-HOLDER
Filed Feb. 27, 1964  5 Sheets-Sheet 1
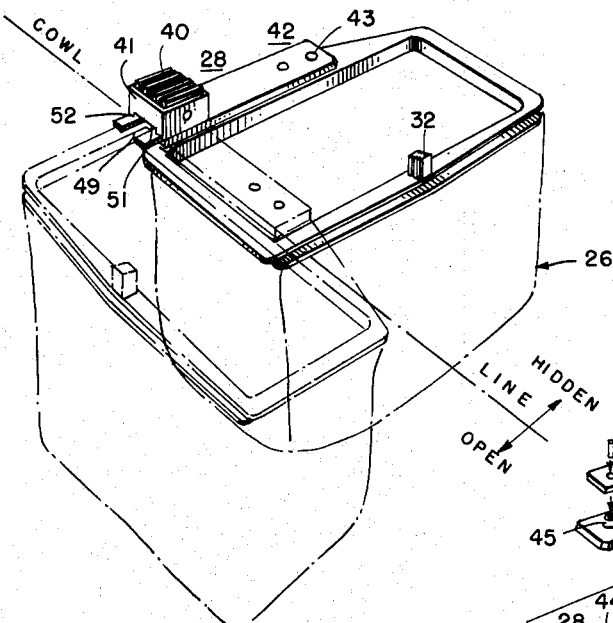
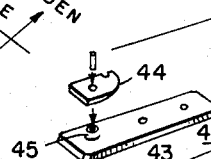
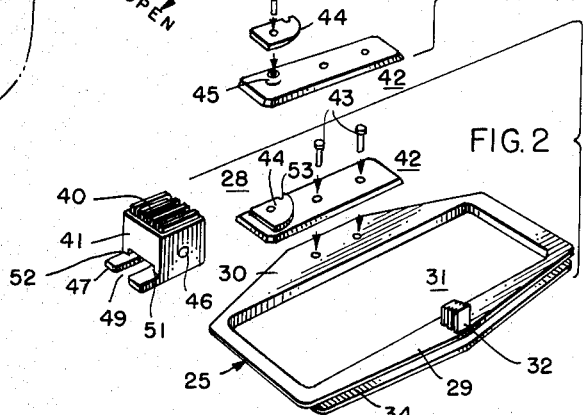
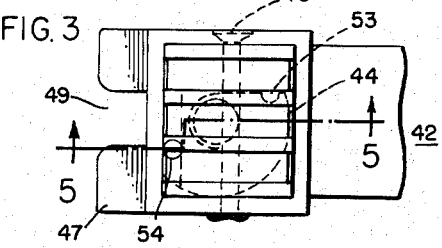
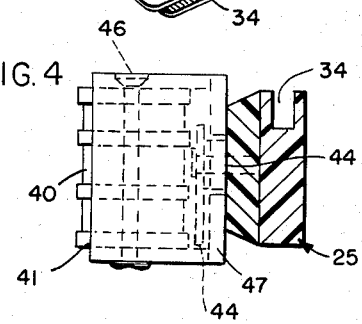
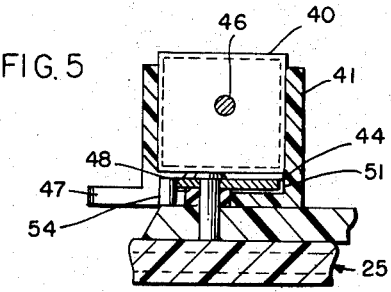
INVENTOR:
WARREN F. DuBOIS
BY
ATT'YS

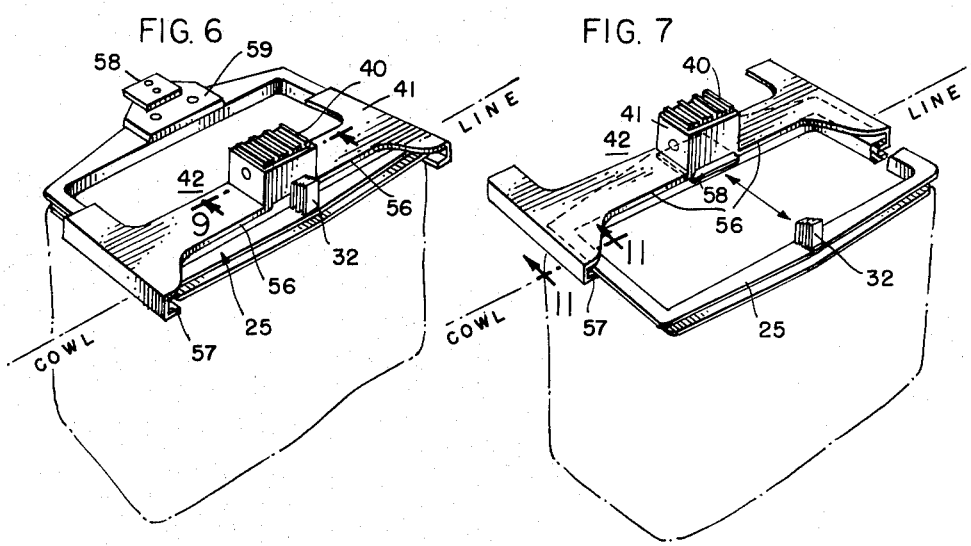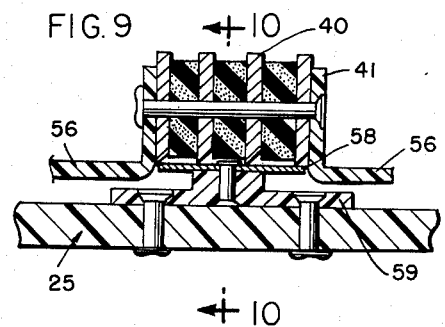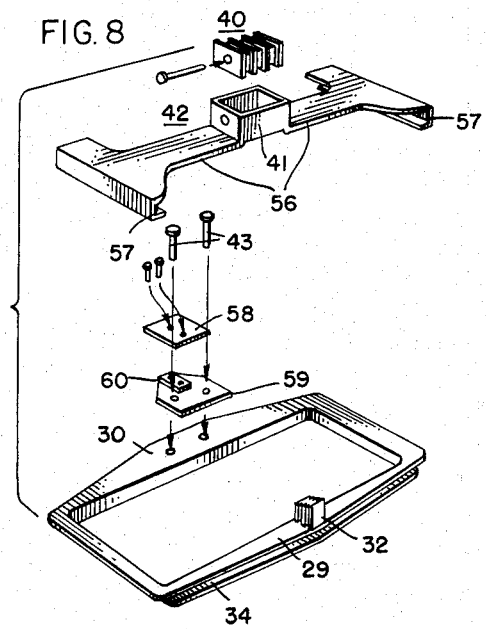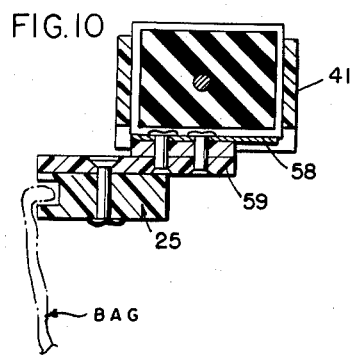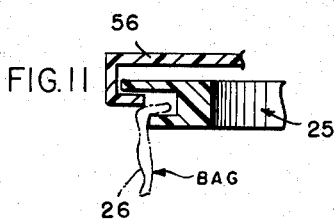

Aug. 17, 1965  W. F. DU BOIS  3,201,072
MOTOR-VEHICLE RECEPTACLE-HOLDER
Filed Feb. 27, 1964  5 Sheets-Sheet 3
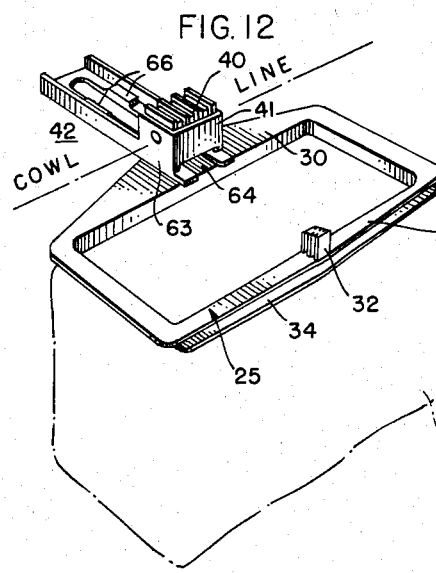
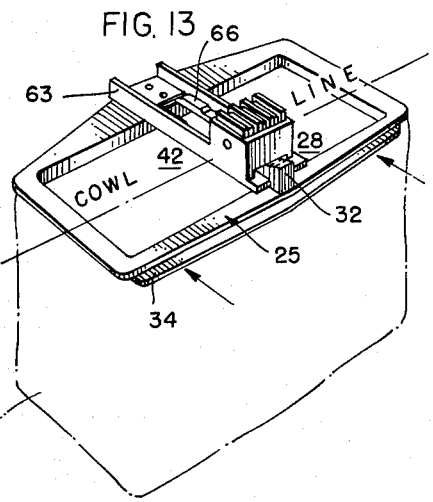
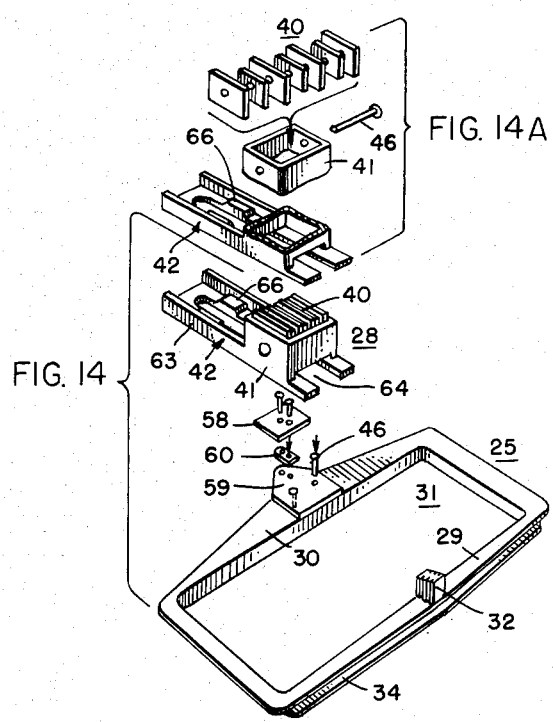
INVENTOR:
WARREN F. DuBOIS
BY
ATT'YS Aug. 17, 1965          W. F. DU BOIS          3,201,072
MOTOR-VEHICLE RECEPTACLE-HOLDER
Filed Feb. 27, 1964                    5 Sheets-Sheet 4
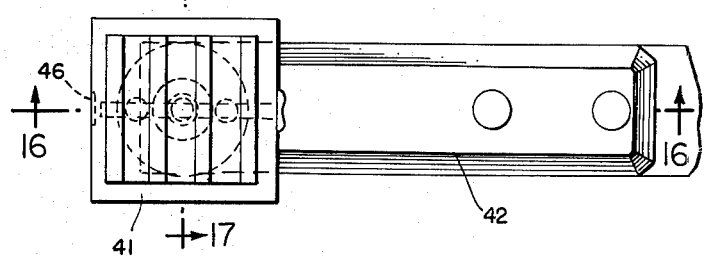
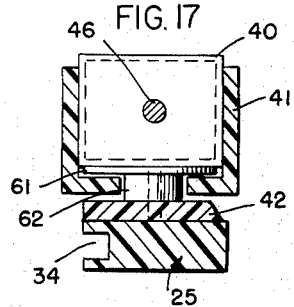
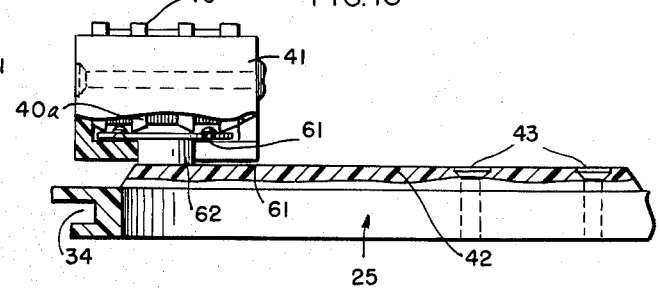
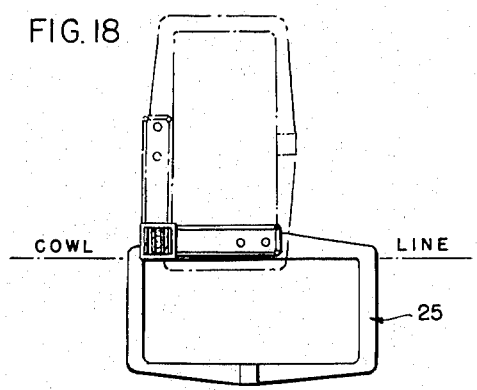
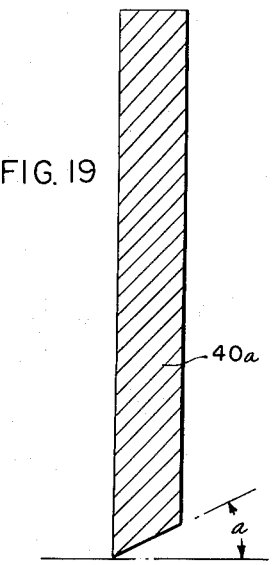
INVENTOR:
WARREN F. DuBOIS
BY
ATT'YS Aug. 17, 1965   W. F. DU BOIS   3,201,072
MOTOR-VEHICLE RECEPTACLE-HOLDER
Filed Feb. 27, 1964   5 Sheets-Sheet 5
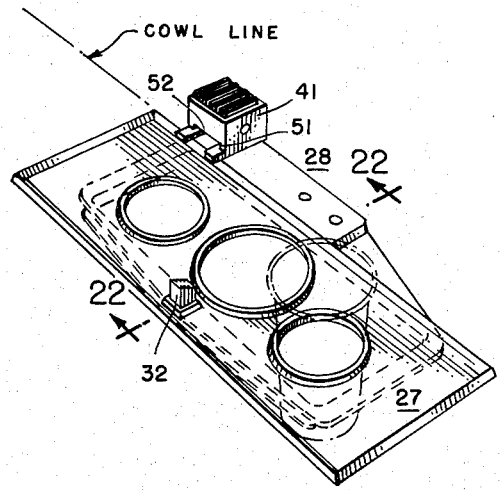
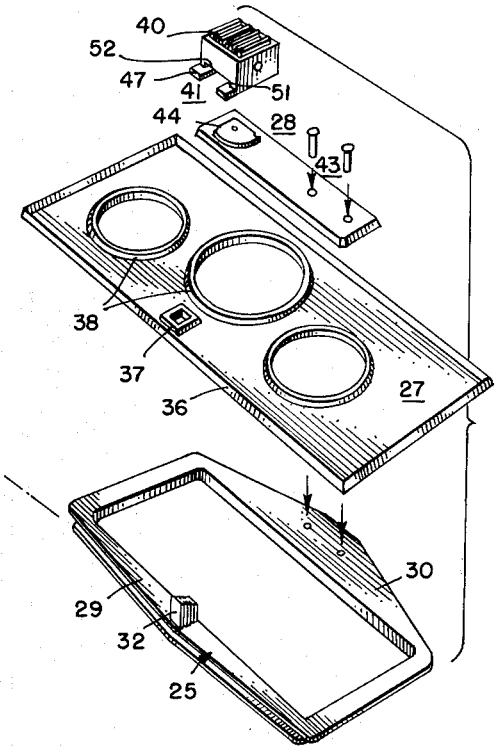
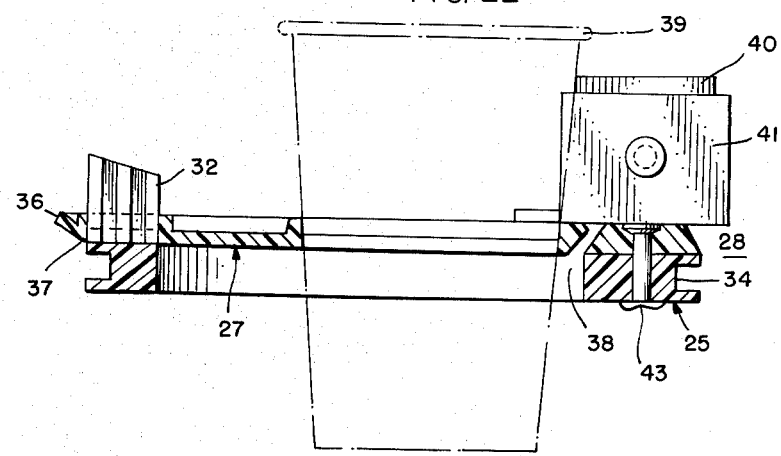
INVENTOR:
WARREN F. DuBOIS
BY
ATT'YS

United States Patent Office 3,201,072
Patented Aug. 17, 1965

3,201,072
MOTOR-VEHICLE RECEPTACLE-HOLDER
Warren F. Du Bois, 150 Belvidere, Forest Park, Ill.
Filed Feb. 27, 1964, Ser. No. 347,894
7 Claims. (Cl. 248—99)

This invention relates to receptacle-holders for suspension in a motor-vehicle driver's compartment.

For motor-vehicles traveling the highways there is need for a practical facility for the mounting of receptacles either for the collection of items, which, if thrown from the vehicle become scenery-defacing litter, or for the support of containers of refreshments.

The main objects of this invention are: to provide an improved form of receptacle-holder for convenient positioning in a motor-vehicle driver's compartment; to provide an improved receptacle-holder of this kind which is readily shiftable into and out of use location from an otherwise concealed location in the vehicle compartment; to provide a motor-vehicle receptacle-holder of this kind adapted for use either to collect items, that otherwise might be thrown out onto the highway, or to support refreshment containers; and to provide an improved receptacle-holder of this kind of such simple and practical construction as to make its marketing very economical and its use highly gratifying.

In the accompanying drawings, showing several adaptations of receptacle-holders constructed in accordance with this invention;

FIGURE 1 is a perspective view of one adaptation wherein the holder is pivoted for swinging from a retracted non-use location shown in full outline, to use location, shown in dotted outline;

FIG. 2 is an exploded perspective of the receptacle-holder and the magnet mounting;

FIG. 2A is an exploded detail of one part of the mounting shown in FIG. 2;

FIG. 3 is an enlarged, plan view of the magnet mounting showing in full outline its position on the supporting member for the receptacle-holder;

FIG. 4 is a right-hand, side elevational view of what is shown in FIG. 3;

FIG. 5 is a sectional elevational view taken on the plane of the line 5—5 of FIG. 3;

FIG. 6 is a perspective view of another adaptation where the receptacle-holder is mounted for front-to-rear shifting, the holder being shown in retracted non-use location;

FIG. 7 is a similar view showing the receptacle-holder in advanced use location;

FIG. 8 is an exploded, perspective of the adaptation shown in FIG. 6;

FIG. 9 is an enlarged, fragmentary, cross-sectional view taken on the plane of the line 9—9 of FIG. 6;

FIG. 10 is a vertical, cross-sectional view taken on the plane of the line 10—10 of FIG. 9;

FIG. 11 is an enlarged, fragmentary, sectional detail taken on the plane of the line 11—11 of FIG. 7;

FIG. 12 is a perspective view of still another adaptation of the receptacle-holder showing the magnet mounting in one of its two possible holder-supporting positions;

FIG. 13 is another view of the adaptation shown in FIG. 12 with the magnet mounting in another of its two possible positions;

FIG. 14 is an exploded perspective of the adaptation shown in FIGS. 12 and 13;

FIG. 14A is an exploded detail of the magnet per se and its mounting bar;

FIG. 15 is a plan view of another adaptation for positioning the receptacle-holder somewhat as it is located in FIGS. 6 and 7;

FIG. 16 is a longitudinal sectional view taken on the plane of the line 16—16 of FIG. 15;

FIG. 17 is a transverse, partly sectional view taken on the plane of the line 17—17 of FIG. 15;

FIG. 18 is a reduced plan view of two locations of the receptacle-holder with the mounting magnet arranged as shown in FIGS. 15 and 16;

FIG. 19 is a much-enlarged, sectional view of one of the magnetic plates of the magnet core 40;

FIG. 20 is a perspective view of an adaptation of this receptacle-holder for use wih a refreshment accessory;

FIG. 21 is an exploded perspective of the view shown in FIG. 20; and

FIG. 22 is an enlarged, transverse, sectional view taken on the plane of the line 22—22 of FIG. 20.

The essential concept of this invention involves a frame element for the support of a receptacle-holder and releasably suspended from a permanent magnet structured to grip a suitable metal part of a motor vehicle to permit shifting of the receptacle-holder into and out of use-location from a retracted non-use location under a vehicle instrument panel.

A receptacle-holder embodying the foregoing concept comprises a frame element 25, for the support thereon of a receptacle 26 (FIG. 1) or a receptacle 27 (FIG. 20), and a permanent magnet mounting 28 for suspending the frame element 25 from a metal support such, for example, as the underside of a motor-vehicle instrument panel, to permit the shifting of the frame element 25 to dispose the receptacle 26 (or 27) in either an advanced use location or a retracted non-use location with respect to the support.

The frame element 25, as herein shown, is an elongated, rectangular-shaped, open element. Such a frame element 25 is the same for all of the adaptations herein shown and described. The front and rear lateral marginal portions 29 and 30 are angled oppositely outward from a frame-defined opening 31. The front lateral marginal portion 29 mounts a knob 32 for use, as will be explained later. The rear lateral marginal portion 30 provides for the attachment of parts of the magnet mounting 28, as will be explained presently. Such a frame element 25 preferably is molded plastic and is formed with a groove 34 around the entire exterior perimeter for the seating of a draw-string (not shown) on the receptacle 26.

The receptacle 26 here is shown as a bag expressly adapted for the collection of disposable items which the passenger or passengers of a motor vehicle all too often are disposed to cast off and litter the highway. Such a bag-receptacle 26 may be formed of any suitable material.

The receptacle 27 here is shown as a tray (FIGS. 20, 22) dimensioned in length to extend slightly beyond the ends of the frame element 25 and in width slightly less than the maximum transverse width of the frame element 25. Such a receptacle-tray 27 here is shown with a shallow, up-standing perimetrical rim 36 and has an aperture 37, medially inward of the front rim portion, to seat over the knob 32. This particular receptacle-tray 27 also is formed of molded plastic and has three circular rimmed openings 38, preferably of different sizes, adapted especially for the seating of conventional paper or plastic cups 39 (FIGS. 20 and 22). Such cups 39 generally would contain a beverage. However, they could be used for other articles, for example, food. Also, it will be obvious other kinds of openings 38—or even mere depressions—could be formed in the tray 27 for the temporary positioning of other types of containers, such as are dispensed at drive-in refreshment stands. For that matter such a tray 27 might be used for the support of refreshment items previously prepared for the enjoyment of passengers in the vehicle where this receptacle-holder is arranged.

The permanent magnet mounting 28 comprises a conventional four-plate core 40 embraced in a holder 41 and a supporting member 42. As shown here, each core plate 40a is tapered, at about 12 degrees (FIG. 19), along its inner edge where contact is made with the respective metal parts on a mounting member 42. This reduced-edge contact is sufficient to hold the frame element 25 in any desired location, but permit easy shifting into and out of position for retention by the magnet core 40. Four different forms of the supporting member 42 are illustrated in the drawings, as now will be explained.

In the adaptation shown in FIGS. 1–5 and 20–22, the supporting member 42 is in the nature of a bar of rigid plastic secured by a pair of fasteners 43 to the marginal portion 30 of the frame element 25 and mounting a swivel head 44 at the free end. The swivel head 44, likewise formed of rigid plastic, approximates quadrant shape and is fixed to the free end of the bar support 42 in spaced relationship thereto by a hub 45 (FIG. 2A). The cubical holder 41 also is formed of rigid plastic wherein the core 40 is secured by a fastener 46—bolt and nut or rivet, the latter preferably.

In this adaptation of FIGS. 1–5 and 20–22, the core holder 41 is fixed on a base plate 47 with one dimension greater than the holder 41 so as to protrude outwardly from one face thereof. This base plate 47 is spaced from the bottom of the holder 41 to provide a pocket 48 for the rotative reception of the swivel head 44. Also, the base plate 47 is formed with a medial slot 49, extending inward from the protruded end thereof, to permit the entrance of the swivel hub 45 to provide for the rotative mounting of the frame element 25. A shoulder 51 (FIGS. 1 and 4) on the core holder 41 limits an opening 52, to the pocket 48, to the width of the swivel head 44. Thus, upon inserting the swivel-head 44 into the pocket 48, and effecting any relative turning of the core holder 41, these parts become inseparable so long as the swivel-head 44 is out of registration with the opening 52. The swivel-head 44 has a notch 53 (FIGS. 2 and 3) formed therein which is adapted to seat a pin-shoulder 54 (FIG. 5). This occurs when the magnet mounting 28 is in its intended use location (FIG. 1) and limits the swinging of the frame element 25 when the magnet holder is pulled as far to the right (FIG. 1) as possible, as shown in dotted outline. Then the seating of the pin shoulder 54 in the swivel-head notch 53 will prevent the frame holder 25 from being swung counter-clockwise further than indicated in FIG. 1.

In the adaptation shown in FIGS. 6 to 11, the supporting member 42 comprises a pair of oppositely-extending arms 56 the inner ends of which are a part of the core holder 41. The outer ends of these arms 56 terminate in transversely-extending and opposed slotted portions 57 wherein the frame element 25 is slidably supported. The magnet core 40 is so fixed on the inner ends of the arms 57 that the under and exposed face of the core 40 is spaced above the under face of the arms 57 sufficiently to permit the entrance under the magnet core 40 of a metal plate 58 medially fixed on a non-magnetic bracket 59, with an interposed, small spacing-pad 60 (FIG. 8), attached to the marginal portion 30 of the frame element 25. Thus, when the frame element 25 is pulled outwardly on the supporting member 42 the metal plate 58 is drawn into position to be in contact with the magnet core 40 to retain the frame element 25 in use location. Of course, if the forward pull on the frame element 25 exceeds the attractive force of the magnet core 40 on the metal plate 58 the frame element 25 can be pulled forwardly free of the support member 42.

This adaptation shown in FIGS. 12–14 is a modification of that shown in FIGS. 6–11 in that the magnet mounting 28 is integrated with the supporting member 42. Here that member 42 is in the form of a plastic, channel-shaped bar 63 having a slot 64 extending inwardly from one end and of a width approximately that of the spacing pad 60 which disposes the metal plate 58 above the non-magnetic supporting bracket 59. The magnet mounting 28, in this instance, is integrated with the channel bar 63 just inwardly of the open end of the slot 64. The magnet core 40 has its exposed under face spaced above the opposed face of the slotted bar 63 to permit the slotted mounting bar to the telescoped between the metal plate 58 and its supporting bracket 59. Thus the bar 63 may be shifted relative to the frame element 25 to position it in its advance use location, as shown in FIG. 12 or its retracted non-use location, as shown in FIG. 13.

The bar 63 has embossments 66 formed on the inner face thereof intermediate the ends and at opposite sides of the slot 64. These embossments 66 tend to wedge under the metal plate 58 and restrain any but an intentional shifting of the frame 25. In particular this tends to preclude any accidental dislodgment of the frame element 25 from the supporting member 42.

In the adaptation shown in FIGS. 15–18 the supporting member 42 is a rigid plastic bar, quite similar to that shown in FIGS. 1 and 2 except the bar in this adaptation is beveled around its entire perimeter. The member 42 is secured by a pair of fasteners 43 to the marginal portion 30 of the frame element 25. At its opposite end the bar 42 mounts a circular metal disk 61 on a hub 62 (FIGS. 16 and 17). The magnet mounting 28 is practically of the same construction as that shown in FIG. 2, except the opening in the spaced base plate 47 is of a width just enough to easily receive the hub 62 with the disk 61 in position to be contacted by the magnet core 40. Thus, in this adaptation, the frame element 25 may be swung from a non-use location, shown in broken outline, into a use-location, as shown in full outline, respectively, in FIG. 18.

The adaptation shown in FIGS. 20–22 exemplifies the use of the previously-described tray-receptacle 27 instead of the litter-bag receptacle 26. In this adaptation the magnet mounting 28 is of the structure shown in FIGS. 1–5.

In the use of any of these adaptations, the receptacle-holder is suspended in the vehicle-driver's compartment at a convenient place from or under the instrument panel. The magnet core 40 is set to so clamp to some metal part as to permit the frame element 25, with its attached receptacle 26 or 27, to be shifted from a non-use location inwardly under the instrument panel to use-location outwardly forward of the panel. For the swivel-mounted adaptations of this receptacle-holder the range of possible use and non-use locations, with respect to an indicated cowl-line, are illustrated in FIGS. 1, 12, 13, 18 and 19. For the slidably-mounted receptacle-holder the opposite positions of the receptacle-holder are illustrated in FIGS. 6 and 7.

It will be understood that details of the construction shown may be altered or omitted without departing from the spirit of the invention as defined by the following claims.

I claim:

1. A receptacle-holder comprising, a frame element of open rectangular contour and having means for detachably positioning a receptacle thereon, a bar fixed along one lateral portion of the frame element, a swivel head fixed on the exposed face of the bar in spaced relationship thereto, and a permanent magnet having a recessed base for the reception of the swivel head to rotatively suspend the frame element from the magnet when the magnet is in contact with a metal support.

2. A receptacle-holder as set forth in claim 1 wherein the swivel head and that portion of the magnet defining the recessed base are relatively contoured to retain the bar and magnet in rotative relationship for any relative positioning thereof other than that which permits the entrance of the swivel head into the magnet recess.

3. A receptacle-holder as set forth in claim 2 wherein the swivel head approximates quadrant-shape and is fixed on a smaller-diameter hub medially of the lateral edges of the bar and the recessed base is formed by a plate having a slot extending inwardly from one edge thereof of a width substantially that of the swivel hub and is fixed to the under face of the magnet in spaced relationship thereto approximately equal to the thickness of the swivel head.

4. A receptacle-holder comprising, a frame element of open rectangular contour and having means for detachably positioning a receptacle thereon, a metal plate fixed on one lateral portion of the frame element and spaced above the face of the lateral portion, and a permanent magnet having a slotted base for telescopic positioning over the metal plate to permit shifting the frame element to position the metal plate thereon in and out of magnetic adherence with the magnet.

5. A receptacle-holder comprising, a frame element of open rectangular contour and having means for detachably positioning a receptacle thereon, a member having opposed parallel slotted ends slidably supporting the frame element for opposite shifting thereon, a magnet fixed medially on the member for the suspension of the frame element from a metal support, a knob on the front lateral portion of the frame element engageable with the supporting member to limit the retraction of the frame element on the member, and a metal plate fixed on the rear lateral portion of the frame element for contact with the magnet to limit the forward shifting of the frame element on the supporting member.

6. A receptacle-holder comprising, a frame element of open rectangular contour and having means for detachably positioning a receptacle thereon, a metal plate fixed on one lateral portion of the frame element and spaced above the face of such lateral portion, a non-magnetic bar slotted longitudinally inward from one end thereof, and a permanent magnet fixed on the bar above the one end thereof with the under face of the magnet spaced from the opposed face of the bar substantially equal to the spacing of the metal plate above the frame element, whereby the bar is adapted for telescopic positioning on the metal plate to permit the shifting of the frame element to move the plate thereon into and out of magnetic adherence with the magnet.

7. A receptacle-holder as set forth in claim 6 wherein the slotted bar has embossments located intermediate its ends and at opposite sides of the slot to wedge under the metal plate and thereby restrain unintentional shifting of the frame element off of its position on the magnet.

References Cited by the Examiner

UNITED STATES PATENTS

| | | | |
|---|---|---|---|
| 2,314,639 | 3/43 | West et al. | 150—1 |
| 2,668,744 | 2/54 | Cockrell | 248—205 |
| 2,843,301 | 7/58 | Worthen | 224—42.45 |
| 2,977,082 | 3/61 | Harris | 248—206 |

CLAUDE A. LE ROY, *Primary Examiner.*